US008897193B2

(12) United States Patent
Lee et al.

(10) Patent No.: US 8,897,193 B2
(45) Date of Patent: Nov. 25, 2014

(54) MULTICAST PACKET TRANSMITTING METHOD OVER WIRELESS COMMUNICATION NETWORK AND WIRELESS COMMUNICATION NETWORK SYSTEM USING THE METHOD

(75) Inventors: Sung Hwan Lee, Yongin-si (KR); Cheol Gi Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1085 days.

(21) Appl. No.: 11/832,280

(22) Filed: Aug. 1, 2007

(65) Prior Publication Data
US 2008/0031177 A1  Feb. 7, 2008

(30) Foreign Application Priority Data

Aug. 1, 2006 (KR) .................. 10-2006-0072666
Apr. 12, 2007 (KR) .................. 10-2007-0036114

(51) Int. Cl.
| | |
|---|---|
| H04W 4/06 | (2009.01) |
| H04W 56/00 | (2009.01) |
| H04J 3/06 | (2006.01) |
| H04J 3/14 | (2006.01) |
| H04L 1/00 | (2006.01) |
| H04L 1/18 | (2006.01) |
| H04H 60/11 | (2008.01) |
| H04L 12/18 | (2006.01) |
| H04H 20/72 | (2008.01) |

(52) U.S. Cl.
CPC ............ *H04H 60/11* (2013.01); *H04L 1/0002* (2013.01); *H04L 1/188* (2013.01); *H04L 1/1829* (2013.01); *H04L 12/189* (2013.01); *H04L 1/1812* (2013.01); *H04L 2001/0093* (2013.01); *H04H 20/72* (2013.01); *H04L 12/1868* (2013.01)

USPC .......... 370/312; 370/350; 370/345; 370/389; 714/748; 714/48

(58) Field of Classification Search
USPC ......... 370/310, 312, 432, 338, 342, 344, 345, 370/389, 390, 350; 714/1, 48, 52, 746, 748, 714/749, 751, 312, 338, 342, 344, 345, 389, 714/390
See application file for complete search history.

(56) References Cited

U.S. PATENT DOCUMENTS 6,404,739 B1 *  6/2002  Gonno .......................... 370/236
7,185,256 B2 *  2/2007  Miki et al. ..................... 714/751
(Continued)

FOREIGN PATENT DOCUMENTS

EP        1684455 A1   7/2006
KR    1020060003764 A   1/2006

OTHER PUBLICATIONS

Steven McCanne et al., "Receiver-driven Layered Multicast"; SIGCOMM; Aug. 1996; pp. 1-14.
(Continued)

*Primary Examiner* — Ahmed Elallam
(74) *Attorney, Agent, or Firm* — Sughrue Mion, PLLC

(57) ABSTRACT

A multicast packet transmitting and receiving method over a wireless communication network is provided. The method includes: transmitting a multicast packet from a sender to a plurality of receivers via a wireless channel; receiving the multicast packet at each of the receivers, determining whether a transmission error occurs in the multicast packet, and simultaneously transmitting a retransmission request from at least one of the receivers to the sender via the wireless channel, according to a result of the determining.

31 Claims, 4 Drawing Sheets

(56) References Cited

U.S. PATENT DOCUMENTS

| | | | |
|---|---|---|---|
| 7,586,930 B2* | 9/2009 | Koski | 370/442 |
| 2002/0116515 A1* | 8/2002 | Hashimoto | 709/230 |
| 2004/0184471 A1* | 9/2004 | Chuah et al. | 370/420 |
| 2005/0216812 A1* | 9/2005 | Leon et al. | 714/748 |
| 2006/0123079 A1* | 6/2006 | Sturniolo et al. | 709/203 |
| 2006/0256740 A1* | 11/2006 | Koski | 370/278 |
| 2007/0064718 A1* | 3/2007 | Ekl et al. | 370/432 |
| 2007/0121569 A1* | 5/2007 | Fukui et al. | 370/347 |
| 2007/0162810 A1* | 7/2007 | Sato et al. | 714/748 |
| 2007/0286121 A1* | 12/2007 | Kolakowski et al. | 370/329 |

OTHER PUBLICATIONS

Wai-tian Tan et al.; "Video Multicast using Layered FEC and Scalable Compression"; IEEE Transactions on Circuits and Systems for Video Technology; vol. 11, No. 3; Mar. 2001; pp. 1-30.

Sally Floyd, et al., "A Reliable Multicast Framework for Lightweight Sessions and Application Level Framing"; IEEE/ACM Transactions on Networking; Nov. 13, 1995; pp. 1-37.

Communication dated Jun. 21, 2013, issued by the Korean Intellectual Property Office in counterpart Korean Application No. 10-2007-0036114.

* cited by examiner

MULTICAST PACKET TRANSMITTING METHOD OVER WIRELESS COMMUNICATION NETWORK AND WIRELESS COMMUNICATION NETWORK SYSTEM USING THE METHOD

CROSS-REFERENCE TO RELATED APPLICATION

This application claims priority from Korean Patent Application No. 10-2006-0072666, filed on Aug. 1, 2006, and Korean Patent Application No. 10-2007-0036114, filed on Apr. 12, 2007 in the Korean Intellectual Property Office, the entire disclosure of which are incorporated herein by reference.

BACKGROUND OF THE INVENTION

1. Field of the Invention

Methods and apparatuses consistent with the present invention relate to transmitting and receiving multicast packets over a wireless communication network, and more particularly, to a media access control (MAC) structure which simultaneously transmits a retransmission request for a multicast packet via a multipath fading channel.

2. Description of the Related Art

As satellite broadcasting and digital multimedia broadcasting (DMB) services are provided, and interest in broadcasting services in shadow areas increase, the melding of broadcasting, where a broadcasting service and a communication service are fused, is under brisk discussion. Particularly, as one discussion of broadcast fusion, a study for providing a broadcasting service using a related art communication network, i.e., a wireless communication network, is being considered.

The broadcasting service transmitting identical data to unspecified individuals is closely associated with a multicast environment. However, the identical data is transmitted to a plurality of nodes in the multicast environment, and therefore a proper feedback from each receiving node may not be received. Accordingly, an automatic repeat request technique may not be utilized in the multicast environment. The automatic repeat request technique is widely used for assuring reliability of transmission data in a data communication system which transmits the data per frame or per packet.

Due to the above described reason, a method of increasing reliability of transmission data has been used in a related art MAC by transmitting multicast data at a low transmission rate using a high transmission power, without a feedback from a receiver. However, a great amount of transmission resources may be unnecessarily wasted to transmit the data in the related art method. In addition to this, it takes a longer time to transmit the same amount of data, therefore consumption of transmission power is great. Also, the related art method is not suitable for high speed data transmission.

In order to solve the problems of the related art MAC, new techniques capable of minimizing the waste of communication effectiveness have been provided when there is no feedback from the receiver. One of the new techniques is Receiver-driven Layered Multicast (RLM). According to the RLM, in a multimedia application, i.e., when multi-layered data having different levels of importance are simultaneously transmitted, one level of important data, such as control information, is transmitted via a transmission channel whose reliability is comparatively higher, and data having comparatively lower importance, such as multimedia data, is transmitted via a transmission channel whose reliability is comparatively lower.

The RLM indicates a technique where nodes whose transmission paths are in comparatively better condition simultaneously receive data, which is transmitted with lower reliability, while allowing as many other nodes as possible to receive data with higher reliability. However, the quality of communication in the RLM system decreases since nodes with poor receiving capabilities frequently cannot receive data, and therefore the data is transmitted with lower reliability.

Other methods, such as Pseudo-Automatic Repeat Request (ARQ) and Layered ARQ, have been provided to solve the problems associated with the related art MAC.

In the Pseudo-ARQ and Layered ARQ techniques, data is transmitted in low reliability via a basic channel by a sender, first recovery data is transmitted via another channel after a delay of a predetermined time, and second recovery data is transmitted via another channel after a subsequent delay of a predetermined time. Namely, recovery data is simultaneously transmitted via a plurality of channels without a retransmission request. In this instance, in a receiver, initial receiving data may be recovered using the first or the second recovery data received in the time difference when an error is detected in data received via the basic channel.

The above described method may reduce power consumption of the receiver in comparison to the related art MAC by constantly transmitting data while having high reliability. However, since the first and the second recovery data are required to be additionally transmitted by the sender, there is no advantage with regard to the power consumption and transmission capacity, in comparison to the related art MAC.

In order to minimize waste of communication effectiveness, new methods capable of properly receiving a feedback from a receiver in the multicast environment have been provided, in addition to the above described method. When the feedback is transmitted from the receiver in the multicast environment, various problems may occur. For instance, a collisions may occur among retransmission requests when the retransmission requests are simultaneously transmitted from a plurality of receivers, which have detected a transmission error included in a multicast packet, and the overhead related to the network operations for preventing the collisions may increase as the number of receivers in the network increase.

In a wired communication environment, each of the receivers transmits the retransmission request after a random back-off period when the retransmission requests are simultaneously transmitted from the plurality of receivers, and the receiver's own retransmission request is suspended after detecting another receiver's transmitting of the retransmission request at the same time. However, the above described methods may not check transmission contents of other nodes, and may not be applicable to a wireless communication network incapable of checking a collision of a packet.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a MAC structure which can effectively transmit and receive a multicast packet over a wireless communication network.

Specifically, the present invention provides a method which can transmit a retransmission request signal in a wireless multicast environment, therefore a multicast packet may be transmitted at high speed, and data may be transmitted with high reliability.

More specifically, the present invention provides a method which can eliminate an overhead for handling a collision among retransmission requests which are simultaneously transmitted from a plurality of receivers, and all of the retransmission requests, simultaneously received via a wireless channel, are received by a sender using a multipath fading technique.

The present invention also provides a multicast packet transmitting and receiving method over a wireless communication network which can minimize waste of channel resources since a sender transmits forward error correction (FEC) information with a multicast packet, a receiver corrects a transmission error of the multicast packet by referring to the FEC information prior to a retransmission request, and subsequently the sender waits for the retransmission request.

The present invention also provides a multicast packet transmitting and receiving method to which an adaptive channel coding technique is applied, wherein a multicast packet is channel coded at a channel coding rate less than a previously transmitted multicast packet when a multicast packet is retransmitted according to receiving retransmission requests from a sender.

According to an aspect of the present invention, there is provided a multicast packet transmitting and receiving method including: transmitting a multicast packet from a sender to a plurality of receivers via a wireless channel; receiving the multicast packet at each of the receivers, checking whether a transmission error occurs in the multicast packet, and simultaneously transmitting a retransmission request from at least one of the receivers to the sender via the wireless channel, according to a result of the checking.

According to another aspect of the present invention, there is provided a multicast packet transmitting method including: transmitting a multicast packet to a plurality of nodes over the wireless communication network via a wireless channel; receiving a retransmission request as a multipath signal, from at least one of the nodes via the wireless channel, the retransmission request corresponding to the multicast packet; and retransmitting the multicast packet to the nodes in response to the received retransmission request.

According to another aspect of the present invention, there is provided a multicast packet receiving method including: receiving a multicast packet via a wireless channel, checking whether a transmission error occurs in the received multicast packet; and transmitting a retransmission request to a transmitting node of the multicast packet, according to a result of the checking, wherein the retransmission request is simultaneously transmitted from at least one of a plurality of receiving nodes, which has received the multicast packet, to the transmitting node via the wireless channel.

According to another aspect of the present invention, there is provided a wireless communication network system including: a transmitting node transmitting the multicast packet via a wireless channel; and a plurality of receiving nodes receiving the multicast packet from the transmitting node, wherein each of the plurality of receiving nodes is simultaneously transmitting a retransmission request for the multicast packet to the transmitting node via the wireless channel, when a transmission error is detected in the received multicast packet.

According to still another aspect of the present invention, there is provided multicast packet transmitting node including: a transmitting unit transmitting multicast packets to a plurality of nodes over the wireless communication network via a wireless channel; and a receiving unit receiving a retransmission request as a multipath signal, from at least one of the plurality of nodes via the wireless channel, the retransmission request corresponding to the multicast packet, wherein the transmitting unit retransmits the multicast packet to the plurality of nodes in response to the received retransmission request.

According to still another aspect of the present invention, there is provided a multicast packet receiving node including: a receiving unit receiving the multicast packet via the wireless channel, and checking whether a transmission error of the received multicast packet occurs; and a transmitting unit transmitting a retransmission request to a transmitting node of the multicast packet according to a result of the transmission error checking, wherein the transmitting unit simultaneously transmits the retransmission request from at least one node of a plurality of nodes to the transmitting node via the wireless channel, the plurality of nodes having received the multicast packet.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
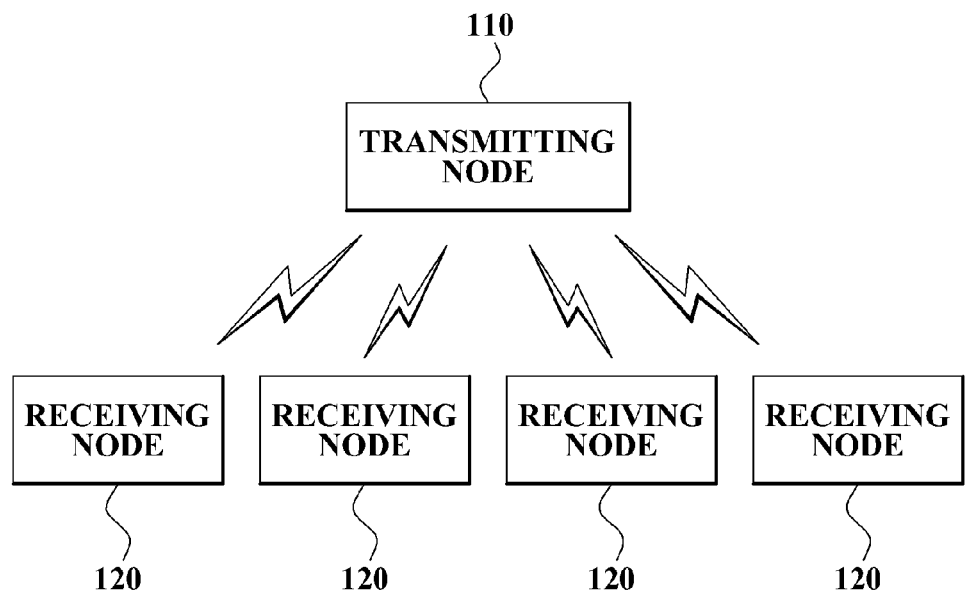
FIG. 1 is a diagram illustrating a wireless multicast environment in which an exemplary embodiment of the present invention may be applied.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a wireless multicast environment in which an exemplary embodiment of the present invention may be applied. The wireless multicast environment of FIG. 1 includes one transmitting node 110 and a plurality of receiving nodes 120. The receiving node 120 may number from dozens to thousands when multimedia data is transmitted to unspecified individuals, i.e., in a broadcasting system, although four receiving nodes 120 are illustrated in FIG. 1 for convenience of description.

As the number of receiving nodes 120 increase, the condition of a wireless channel deteriorates and the number of receiving nodes 120 which are incapable of normally receiving a multicast packet increases. Retransmission requests for the multicast packet are required to be properly transmitted from the receiving nodes 120 to the transmitting node 110 in order to support automatic repeat request (ARS) in the wireless environment, as suggested in the exemplary embodiment of the present invention.

Figure 2:
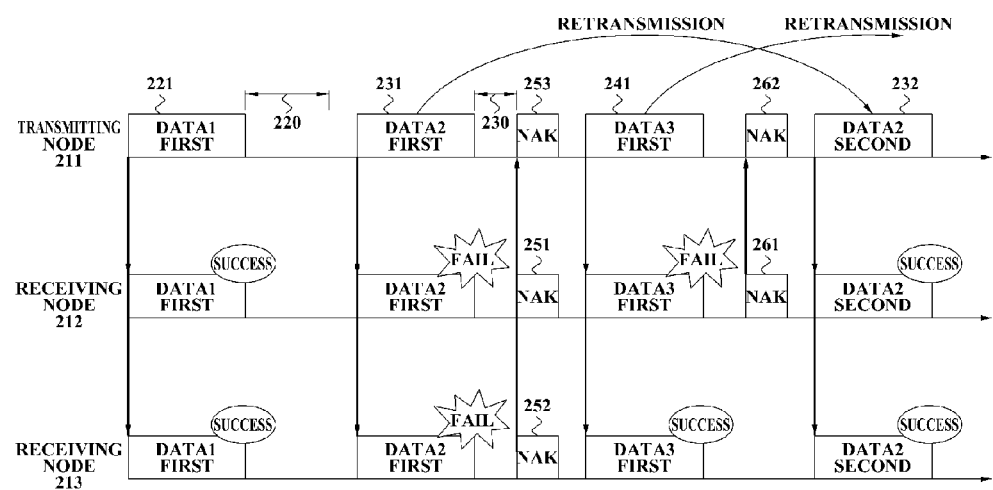
FIG. 2 is a diagram illustrating operations where a multicast packet is transmitted from a transmitting node to a plurality of receiving nodes according to an exemplary embodiment of the present invention.

FIG. 2 is a diagram illustrating the transmitting and receiving timing of a multicast packet when retransmission requests are transmitted to a transmitting node 211, when receiving nodes 212 and 213 do not normally receive the multicast packet.

For reference, negative acknowledgment (NACK) packets, reporting the receiving nodes 212 and 213 did not normally receive the multicast packet, being sent to the transmitting node 211, will be taken as an example with respect to the retransmission requests.

Referring to FIG. 2, the transmitting node 211 transmits a first multicast packet DATA1 221 and waits for a response from the receiving nodes 212 and 213 for a predetermined time 220. The receiving nodes 212 and 213 prepare to receive a second multicast packet DATA2 231 without transmitting any response signal to the transmitting node 211 when the receiving nodes 212 and 213 normally receive the first multicast packet 221.

The transmitting node 211 determines that the first multicast packet DATA1 221 was normally received by all the receiving nodes 212 and 213, and transmits a subsequent multicast packet, i.e., the second multicast packet DATA2 231, via a wireless channel when the transmitting node 211 does not receive a response from the receiving nodes 212 and 213 after the predetermined time 220.

An example of when the receiving nodes 212 and 213 fail to receive the second multicast packet DATA2 231 is illustrated in FIG. 2. Each of the receiving nodes 212 and 213 respectively transmits the NACK packets 251 and 252 to the transmitting node 211 after waiting for a predetermined time 230 when the receiving nodes 212 and 213 fail to receive the second multicast packet DATA2 231. For reference, the receiving nodes 212 and 213 may detect a transmission error included in the second multicast packet DATA2 231 using a cyclic redundancy check (CRC) bit, included in the multicast packet DATA2 231. Also, when the multicast packet DATA2 231 is channel coded and transmitted, and when data decoding of a receiving signal fails, it is determined to fail in receiving the multicast packet 231, and the NACK packets 251 and 252 may be transmitted.

According to a related art technique of transmitting a feedback with respect to a receiving result of a multicast packet from a receiver to a sender in the multicast environment, each of a plurality of receivers respectively transmit a plurality of NACK packets to a sender when the plurality of receivers fail to receive the multicast packet. The above operation is for preventing a collision among the plurality of NACK packets. In this case, in order to prevent a collision among the NACK packets, each of the plurality of NACK packets are sequentially transmitted by arranging transmission timing of the NACK packets or using a random backoff timer for transmitting the NACK packets.

Conversely, according to an exemplary embodiment of the present invention, the NACK packets 251 and 252 are simultaneously transmitted to the transmitting node 211 using characteristics of a wireless channel by synchronizing transmission timing of the NACK packets 251 and 252 of the receiving nodes 212 and 213. Generally, almost all wireless communication systems are designed to be applicable to a wireless channel, which is modeled as a multipath fading channel. Subsequently, when the two receiving nodes 212 and 213 simultaneously transmit identical data, and when headers of the two receiving nodes 212 and 213 are identical with each other, an imaginary multipath environment becomes embodied since physical waves to be transmitted are virtually identical.

Accordingly, the transmitting node 211 receives an NACK packet 253 by detecting the NACK packets 251 and 252 transmitted by the receiving nodes 212 and 213 not as a collision, but as a multipath signal, without a collision. The transmitting node 211 retransmits a corresponding multicast packet to all the receiving nodes 212 and 213, included in the multicast group, regardless of an originating node that a NACK packet is being transmitted from, when a NACK packet is transmitted from at least one node of the receiving nodes 212 and 213.

More specifically, the transmitting node 211 detects the NACK packets 251 and 252, which are respectively transmitted from each of the receiving nodes 212 and 213, as one NACK packet 253 by properly compensating time delays and frequency offsets. As described above, in order to receive one NACK packet 253 from a virtual multipath signal, a diversity technique is used. The diversity technique is a well-known technique to receive a multipath signal in a wireless communication system, therefore a detailed description concerning the diversity technique will be omitted in the specification.

As described above, in order to receive and detect the NACK packets 251 and 252 as a multipath signal, which is simultaneously transmitted from at least one of the receiving nodes 212 and 213, as one NACK packet 253, each of the NACK packets 251 and 252 is required to be received via an identical channel and the headers of the NACK packets 251 and 252 are required to include identical data. Namely, regardless of an originating node that each NACK packet is being transmitted from, each of the NACK packets 251 and 252 is required to have an identical destination address (DA) and an identical source address (SA). Since all NACK packets 251 and 252 have a network address of the transmitting node 211 as a common DA and a multicast group address as a common SA in a multicast environment, the above described condition may be satisfied.

As described above, the exemplary embodiment of the present invention does not prevent a collision among the NACK packets 251 and 252 but advantageously uses the collision, therefore waiting time which is wasted for guarding against the collision may be eliminated, and consequently a data transmission throughput of a multicast communication system may be increased.

Referring back to FIG. 2, the transmitting node 211 waits for the predetermined time 230 until the NACK packet 253 is received while the receiving nodes 212 and 213 are simultaneously transmitting the NACK packets 251 and 252. In this instance, since the NACK packet 253 is received from the receiving nodes 212 and 213 within the predetermined time 230, the transmitting node 211 determines at least one of the receiving nodes 212 and 213 fails to receive the second multicast packet DATA2 231, and retransmits a second multicast packet DATA2 232 to the all nodes 212 and 213, which are included in the multicast group.

However, as illustrated in FIG. 2, when a subsequent, i.e., a third multicast packet DATA3 241, is loaded in a transmitting buffer of the transmitting node 211, the third multicast packet 241 may be initially transmitted, and the second multicast packet DATA2 232 may be retransmitted. As described above, the retransmitted multicast packet is not necessarily transmitted just after the previously transmitted multicast packet, and may be transmitted in a subsequent turn according to a transmission schedule of the transmitting node 211.

According to an exemplary embodiment, the retransmitted second multicast packet DATA2 232 may be an identical type of a multicast packet as the previously transmitted second multicast packet DATA2 231. When characteristics of a channel change according to time changes, or spatial movement of a mobile terminal, i.e., the receiving nodes 212 and 213, the retransmitting of the identical packet in a predetermined time interval may be significant.

According to another exemplary embodiment, the retransmitted second multicast packet DATA2 232 may be a channel coded multicast packet at a lower coding rate than the previously transmitted second multicast packet DATA2 231. Namely, when the second multicast packet DATA2 231 is channel coded to be transmitted, and when the receiving nodes 212 and 213 fail to decode data from a receiving signal since a channel condition is poor, a retransmission of the second multicast packet DATA2 231 may be requested by transmitting the NACK packets 251 and 252 to the transmitting node 211.

According to the exemplary embodiment of the present invention, a comparatively stronger transmission signal pattern against a transmission error may be formed by lowering the coding rate of the retransmitted second multicast packet DATA2 232. As described above, a success rate of transmission may be effectively enhanced by gradually decreasing the channel coding rate of the retransmitted second multicast packet 232 whenever the NACK packets 251 and 252 are received.

Further, when the gradually decreasing channel coding rate is repeatedly applied to the sequentially transmitted multicast packets, an optimal channel coding rate suitable for channel characteristics may be adaptively obtained by gradually increasing a channel coding rate when a multicast packet is successfully transmitted without a retransmission for a predetermined amount of time.

According to the exemplary embodiment of the present invention, the multicast packet DATA2 231 includes FEC information, and the receiving nodes 212 and 213 correct a transmission error, which is included in the multicast packet 231, by referring to the FEC information prior to transmitting the NACK packets 251 and 252. When the correcting of the transmission error is successful, the NACK packets 251 and 252 are not transmitted, and when correcting of the transmission error is not successful, the NACK packets 251 and 252 are transmitted.

For reference, it is illustrated in FIG. 2 when the second multicast packet 232 is successfully transmitted to each of the receiving nodes 212 and 213. However, the corresponding second multicast packet DATA2 232 may be retransmitted when there is a node which fails to receive the second multicast packet DATA2 232. In this case, a predetermined threshold is established to prevent an endless repetition, and when repeatedly failing to transmit the corresponding multicast packet 232 even when the corresponding multicast packet 232 is repeatedly transmitted as many as a number of the threshold, it may be determined to terminate the transmitting of the corresponding multicast packet 232 to transmit a subsequent multicast packet.

As described above, the transmitting node 211 retransmits a corresponding multicast packet when an NACK packet is transmitted from at least one of the receiving nodes 212 and 213. A third multicast packet DATA3 241, is not normally received by the receiving node 212, but is normally received by the receiving node 213. Subsequently, an NACK packet 261 is transmitted only from the receiving node 212. The transmitting node 211 receives an NACK packet 262 as a multipath signal, detects at least one node of the receiving nodes 212 and 213 failed to receive the third multicast packet DATA3 241, and retransmits the third multicast packet DATA3 241. In this instance, the third multicast packet DATA3 241 may be retransmitted after retransmitting the second multicast packet DATA2 232 since the second multicast packet 232 to be retransmitted is loaded in a transmission buffer (now shown).

Figure 3:
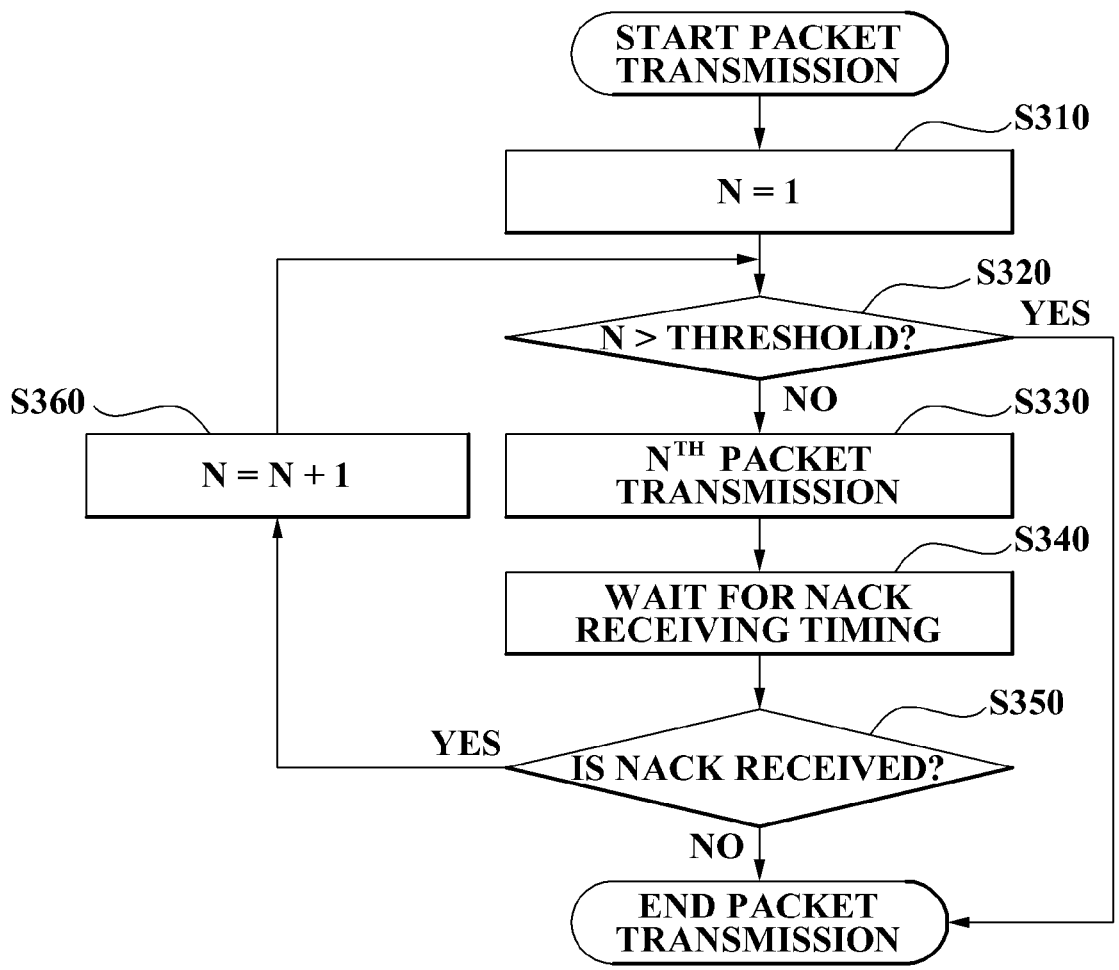
FIG. 3 is a flowchart illustrating a multicast packet transmitting method according to an exemplary embodiment of the present invention.

FIG. 3 is a flowchart illustrating a multicast packet transmitting method according to an exemplary embodiment of the present invention. Referring to FIG. 3, operations of transmitting the multicast packet in a transmitting node is as follows.

In operation S310, a counter N, i.e., recording a retransmission number of the multicast packet, is initialized as one when the transmitting of the multicast packet starts by a transmission request for a specific multicast packet.

In operation S320, it is determined whether N is greater than a predetermined threshold. Further transmission of a corresponding multicast packet is terminated and a subsequent multicast packet is prepared for transmission if N is greater than the predetermined threshold due to a repeated retransmission by comparing the value of N with the predetermined threshold. Conversely, a transmitting operation of the multicast packet is performed if N is not greater than the threshold as a result of the comparing.

In operation S330, the multicast packet is transmitted to a plurality of receiving nodes via a wireless channel. The transmitting node may encode the multicast packet into a predetermined error correction code in order to increase a success rate for receiving the multicast packet. Also, redundancy of the encoded error correction code may be decreased by puncturing, i.e., partially eliminating parity bits, after the encoding. As an example of the encoding, there are channel coding methods using a turbo code, a block code, a convolutional code, and the like. The receiving node recovers transmission data by decoding the received multicast packet, encoded in various types, according to a predetermined method.

In operation S340, the transmitting node which has transmitted the multicast packet waits for a predetermined time for an NACK packet to be received from the receiving nodes. The transmitting node receives the NACK packet as a multipath signal, the NACK packet being synchronized via an identical channel and simultaneously transmitted from at least one of the receiving nodes. Specifically, the NACK packet signals, which are respectively transmitted from the plurality of the receiving nodes, are detected as one NACK packet signal received via a multipath.

Subsequently, in operation S350, the transmitting node repeats the operations of transmitting the multicast packet from the operation S320, in order to retransmit the multicast packet to all of the plurality of receiving nodes included in a multicast group, regardless of the location of an originating node that an NACK packet is being transmitted from, when the NACK packet is received within the predetermined time. In operation S360, a value of the counter N is increased by one to record retransmission times.

According to an exemplary embodiment of the present invention, the retransmitted multicast packet may be channel coded and transmitted at a lower channel coding rate than a previously transmitted multicast packet. Subsequently, the receiving nodes may recover original data using less information when a channel condition is poor, by encoding a greater amount of information, which includes FEC information, when retransmitting identical data via a channel in which transmission has failed. As an example, in WiMedia ultra-wideband (UWB), i.e., orthogonal frequency division multiplexing (OFDM), providing four steps of channel coding rates, the multicast packet may be retransmitted by decreasing the channel coding rate by one step whenever the transmitting node fails to transmit the multicast packet and receives the NACK packet.

Conversely, the transmitting node determines all the receiving nodes have received the multicast packet without an error, and terminates the transmitting of the corresponding multicast packet in order to prepare a subsequent multicast packet when an NACK packet is not received from all the receiving nodes after the predetermined time.

Figure 4:
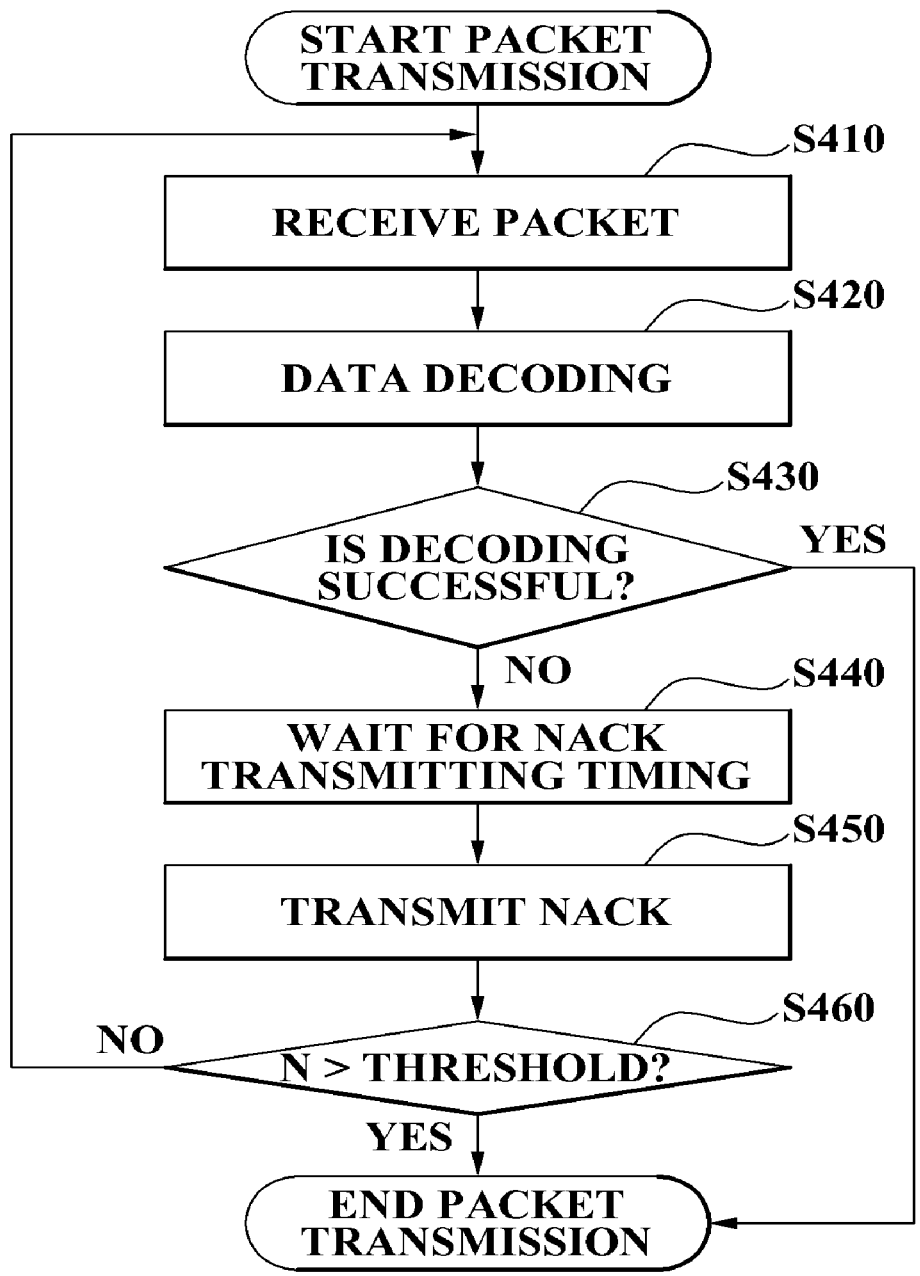
FIG. 4 is a flowchart illustrating a multicast packet receiving method according to an exemplary embodiment of the present invention.

FIG. 4 is a flowchart illustrating a multicast packet receiving method according to an exemplary embodiment of the present invention. Referring to FIG. 4, receiving of the multicast packet, which is transmitted from a transmitting node to the plurality of receiving nodes, is as follows.

In operation S410, each of the receiving nodes receives the multicast packet from the transmitting node via a wireless channel.

The receiving nodes check whether a transmission error occurs in the received multicast packet. Specifically, the checking may be performed using a CRC bit, included in the multicast packet. As another example of checking the transmission error, operations S420 and S430 are illustrated in FIG. 4. In operation S420, data, which is transmitted from the transmitting node, is detected by decoding the received multicast packet signal. In operation S430, it is determined whether the transmission error occurs, according to whether the decoding of the received multicast packet signal is successful in operation S420.

If the decoding is successful, the receiving nodes determine the multicast packet is successfully received, and terminate the receiving of the corresponding multicast packet to prepare a subsequent multicast packet. However, if the decoding is not successful, the receiving nodes perform operations to transmit an NACK packet to the transmitting node in order to request a retransmission of the corresponding multicast packet. As described above, transmission resources may be saved by decreasing a number of the transmitted NACK packets since original data is recovered from FEC information, included in the multicast packet, before transmitting the NACK packet.

In operation S440, each of the receiving nodes waits for a predetermined period of time in order to simultaneously transmit the NACK packet, subsequently a virtual multipath signal may be generated using characteristics of a wireless channel since the NACK packet is transmitted by, not transmitting the NACK packet upon checking the transmission error, but synchronizing transmission timing of the NACK packet.

As illustrated in operation S450, at least one of the receiving nodes transmitting the NACK packet, simultaneously transmits the NACK packet to an identical transmitting node at an identical time. Accordingly, an NACK receiving environment may be established, i.e., the NACK packet is received by having different time delays and different frequency offsets using a multipath fading effect, even when one NACK packet is transmitted via a wireless channel. Subsequently, the NACK packets which are transmitted from all the receiving nodes have an exactly identical header.

In operation S460, the transmitting node determines whether a value of the counter N is greater than a threshold at the transmitting node. If it is determined that the value of the counter N is greater than the threshold at the transmitting node, the transmitting node discards a corresponding multicast packet since a value of the counter N is greater than a threshold at the transmitting node. While maintaining an identical value at the receiving node, the counter N stores a retransmission number at the transmitting node. Specifically, if a value of the counter N maintained at the receiving nodes is greater than the threshold, it is determined the transmitting node discards the corresponding multicast packet since a value of the counter N is greater than the threshold. The receiving operation of the corresponding multicast is terminated to prepare a subsequent multicast packet, instead of preparing $N+1^{th}$ retransmission.

If a value of the counter N is not greater than the threshold, the receiving operations are repeatedly performed from operation S410 to receive a multicast packet, retransmitted from the transmitting node.

For reference, the exemplary embodiment of the present invention may be applied to all types of wireless communication networks transmitting a multicast packet via a wireless channel which is modeled as a multipath fading channel. Specifically, the exemplary embodiment of the present invention may be applied to a Digital Multimedia Broadcasting (DMB) system, a portable Internet system, a wireless local area network (LAN) system and the like, subsequently a sender of the exemplary embodiment of the present invention may be established at a mobile communication base station, a portable Internet base station or a Wireless LAN access point. Also, the sender of the present invention may be embodied as a type of a network device which can receive a multicast packet using a wireless channel by being installed in various types of mobile terminals.

According to another exemplary embodiment of the present invention, the wireless communication is a type of a digital communication network which is configured in an ultra-wideband (UWB) wireless communication network, and a transmitting node and a receiving node of the wireless communication of the exemplary embodiment of the present invention is capable of transmitting and receiving a multicast packet according to the UWB standard based on the wireless multimedia WiMedia protocol.

The aforementioned wireless communication systems, e.g. the DMB, the portable Internet, the wireless LAN, the UWB, exchange data in an Orthogonal Frequency Division Multiplexing (OFDM) scheme, and the OFDM scheme, are effective against multipath fading and burst noise, therefore are suitable for a wireless communication system supporting high speed data transmission. The exemplary embodiments of the present invention may be used for the wireless communication network, and for transmitting real time multimedia streaming data to a plurality of receiving nodes.

The multicast packet is transmitted by one transmitting node in the specification. However, at least two transmitting nodes with overlapping covering areas may be used, In this instance, different data, transmitted from each of the transmitting nodes, are distinguished by a packet header including a different multicast group identifier, and therefore may be successfully transmitted to the plurality of receiving nodes included in an individual multicast group.

Also, it will be apparent to those of ordinary skill in the art that the multipath signal receiving technique, used for receiving all NACK packets transmitted from the transmitting node to the plurality of receiving nodes, includes various types of diversity techniques, and may include various wireless receiving techniques.

From the above, the multicast packet transmitting and receiving methods of the exemplary embodiment of the present invention has been described by referring to FIGS. 3 and 4 from the viewpoint of a transmitting node and a receiving node. With respect to the multicast packet transmitting and receiving methods of the exemplary embodiments of the present invention, the aforementioned descriptions of FIG. 2 may be similarly applicable, therefore a detailed description regarding the multicast packet transmitting and receiving methods will be omitted.

Figure 5:
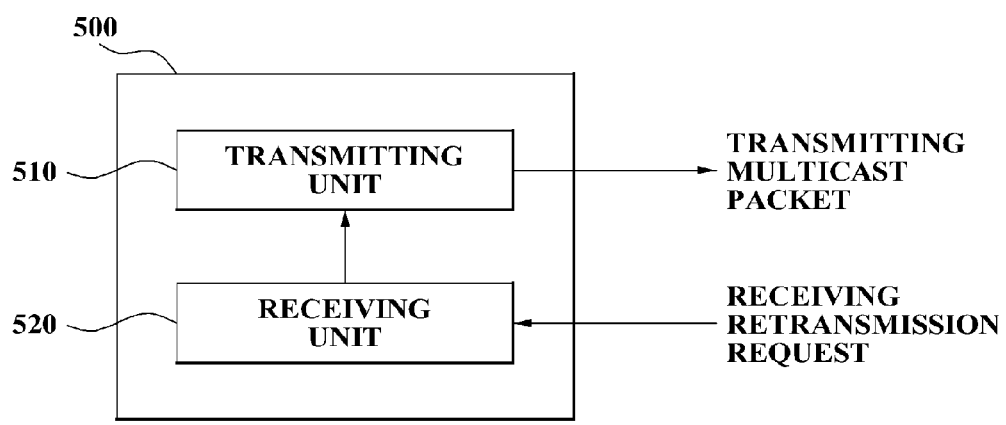
FIG. 5 is a diagram illustrating a structure of a transmitting node of a multicast packet according to an exemplary embodiment of the present invention.

FIG. 5 is a diagram illustrating a structure of a transmitting node of the multicast packet 500 according to an exemplary embodiment of the present invention.

The transmitting node of the multicast packet 500 includes a transmitting unit 510 and a receiving unit 520. The transmitting unit 510 transmits a multicast packet to a plurality of nodes over a wireless communication network via a wireless channel, and the receiving unit 520 receives a retransmission request as a multipath signal, from at least one of the nodes via the wireless channel, the retransmission request corresponding to the multicast packet. The transmitting unit 510 retransmits the multicast packet to the plurality of nodes in response to the received retransmission request.

When the transmitting unit 510 transmits the specific multicast packet to the plurality of nodes over the wireless communication network via the wireless channel, the multicast packet transmitting node 500 waits for a predetermined time, and checks whether a retransmission request corresponding to the transmitted multicast packet is received.

The transmitting unit 510 transmits a second multicast packet to be transmitted after the previously transmitted first multicast packet when the retransmission request corresponding to the transmitted first multicast packet is not received via the receiving unit 520, the transmitted first multicast packet being transmitted within the predetermined time.

When the retransmission request corresponding to the transmitted first multicast packet is received via the receiving unit 520, the transmitting unit 510 transmits the first multicast packet to all receiving nodes, which are included in a multicast group where any one receiving node has received the retransmission request.

According to an embodiment of the present invention, when the second multicast packet is already loaded in a transmitting buffer of the transmitting unit 510, the transmitting unit 510 transmits the second multicast packet, and subsequently retransmits the first multicast packet.

According to an embodiment of the present invention, the first multicast packet retransmitted by the transmitting unit 510 may be an identical type to the previously transmitted first multimedia packet. However, according to another embodiment of the present invention, the transmitting unit 510 may transmit the retransmitted first multicast packet at a lower coding rate than the previously transmitted first multicast packet.

Figure 6:
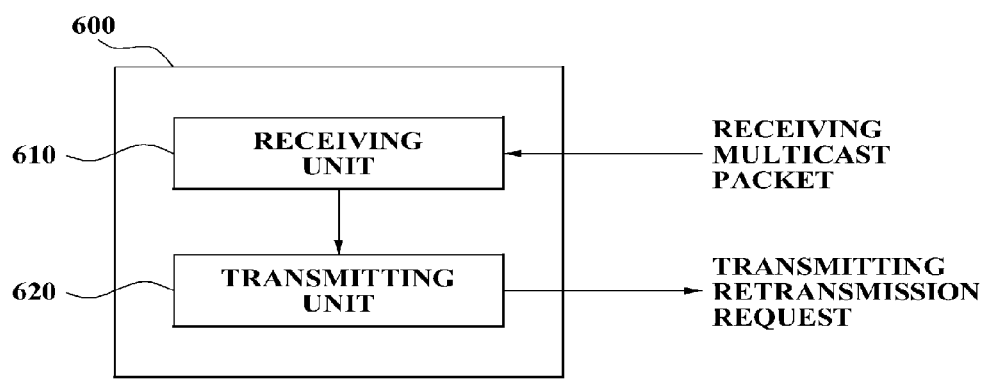
FIG. 6 is a diagram illustrating a structure of a receiving node of a multicast packet according to an exemplary embodiment of the present invention.

FIG. 6 is a diagram illustrating a structure of a receiving node 600 of a multicast packet according to an exemplary embodiment of the present invention.

The receiving node 600 of the multicast packet includes a receiving unit 610 and a transmitting unit 620. The receiving unit 610 receives the multicast packet via a wireless channel, and checks whether a transmission error of the received multicast packet occurs in the multicast packet. The transmitting unit 620 transmits a retransmission request, which corresponds to the received multicast packet, to a transmitting node of the multicast packet according to a result of the checking. The transmitting unit 620 simultaneously transmits the retransmission request from at least one node of a plurality of nodes to the transmitting node via the wireless channel, the plurality of nodes having received the multicast packet.

According to an embodiment of the present invention, the received multicast packet includes forward error correction information, and the receiving unit 610 of the receiving node 600 of the multicast packet checks whether a transmission error of the received multicast packet occurs. According to a result of the checking, the receiving unit 610 corrects the transmission error using the forward error correction information when the transmission error occurs in the multicast packet. The transmitting unit 620 transmits a retransmission request corresponding to the received multicast packet when the receiving unit 610 fails to correct the transmission error using the forward error correction information.

The multicast packet transmitting and receiving method over a wireless communication network according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Also, a scope of the exemplary embodiments of the present invention includes a wireless communication system which embodies an automatic repeat request (ARQ) in a wireless multicast environment by including a plurality of receiving nodes which receive a multicast packet from the transmitting nodes, and simultaneously transmits a retransmission request to a transmitting node via a wireless channel, the retransmission request corresponding to the multicast packet and being transmitted in a NACK packet type.

Each of the plurality of receiving nodes that detects a transmission error transmits a NACK packet, and the transmitting node retransmits a corresponding multicast packet to the plurality of the receiving nodes when the NACK packet is received from at least one of the plurality of receiving nodes. The transmitting node receives the NACK packet received from at least one of the receiving nodes as a multipath signal, and retransmits the multicast packet to all receiving nodes, regardless of an originating node the NACK packet is transmitted from, by checking the NACK packets as one NACK packet.

With respect to the wireless communication system, the exemplary embodiments described in FIGS. 1 through 4 may be similarly applicable, therefore a detailed description regarding the wireless communication system will be omitted.

According to the exemplary embodiments of the present invention, a multicast packet transmitting and receiving method and a wireless communication network using a method which provides an MAC structure which can effectively transmit and receive a multicast packet over the wireless communication network, and when the MAC structure is provided, data included in the multicast packet can be transmitted while having high reliability and increased transmission speed by transmitting a retransmission request even in a wireless multicast environment.

According to the exemplary embodiments of the present invention, an overhead for handling collisions among the retransmission requests can be eliminated since retransmission requests which are simultaneously transmitted from a plurality of receivers, and simultaneously received via a wireless channel, are received by a sender using a multipath fading technique.

According to the exemplary embodiments of the present invention, wireless communication resources can be used without waste, and a huge amount of multimedia data can be transmitted to a plurality of users via a multicast environment.

According to the exemplary embodiments of the present invention, waste of channel resources can be minimized since a sender transmits FEC information with a multicast packet, a receiver corrects a transmission error of the multicast packet by referring to the FEC information prior to a retransmission request, and subsequently the sender waits for the retransmission request.

According to the exemplary embodiments of the present invention, a channel coding rate can be optimized for characteristics of each channel by gradually lowering the channel coding rate of a multicast packet when the multicast packet is retransmitted by a retransmission request.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multicast packet transmitting and receiving method over a wireless communication network, the method comprising:
   transmitting a multicast packet from a sender to a plurality of receivers via a wireless channel;
   receiving the multicast packet at each of the plurality of receivers;
   determining whether a transmission error occurs in the multicast packet; and
   simultaneously transmitting retransmission requests from the plurality of receivers to the sender via the wireless channel by synchronizing a transmission timing of the plurality of receivers, according to a result of the determining,
   wherein the retransmission requests have an identical destination address (DA) and an identical source address (SA),
   wherein a retransmitting operation of the multicast packet is performed if a number of times of transmission of the multicast packet is not greater than a predetermined threshold, and
   wherein a channel coding rate of the multicast packet is increased when previously transmitted sequential multicast packets are successfully transmitted for a predetermined number of times without a retransmission.

2. The method of claim 1, further comprising:
   receiving the retransmission request from the plurality of receivers, and retransmitting the multicast packet from the sender to the plurality of receivers according to the received retransmission request.

3. The method of claim 2, wherein the receiving of the retransmission request from the at least one of the plurality of receivers, and retransmitting the multicast packet from the sender to the plurality of receivers according to the received retransmission request comprises:
   decreasing the channel coding rate of the multicast packet to a predetermined level;
   repeatedly channel coding the multicast packet according to the decreased channel coding rate; and
   retransmitting the channel coded multicast packet to the plurality of receivers.

4. The method of claim 1, wherein the multicast packet comprises forward error correction information, and the simultaneously transmitting of the retransmission request from the plurality of receivers to the sender via the wireless channel further comprises correcting the transmission error by referring to the forward error correction information if it is determined that the transmission error occurs in the multicast packet.

5. The method of claim 4, wherein the simultaneously transmitting of the retransmission request transmits the retransmission request when the transmission error cannot be corrected.

6. The method of claim 1, wherein the retransmission request is transmitted in a negative acknowledgement packet type.

7. The method of claim 1, wherein the multicast packet comprises real time multimedia streaming data.

8. A multicast packet transmission method over a wireless communication network, the method comprising:
   transmitting a multicast packet to a plurality of nodes over the wireless communication network via a wireless channel;
   receiving retransmission requests as a multipath signal from the plurality of nodes via the wireless channel, the retransmission request corresponding to the multicast packet; and
   retransmitting the multicast packet to the plurality of nodes in response to the received retransmission request,
   wherein the retransmission requests have an identical destination address (DA) and an identical source address (SA),
   wherein a retransmitting operation of the multicast packet is performed if a number of times of transmission of the multicast packet is not greater than a predetermined threshold, and
   wherein a channel coding rate of the multicast packet is increased when previously transmitted sequential multicast packets are successfully transmitted for a predetermined number of times without a retransmission.

9. The method of claim 8, further comprising:
   waiting for a predetermined time until the retransmission request is received.

10. The method of claim 9, further comprising:
    transmitting a subsequent multicast packet if the retransmission request is not received until the predetermined time passes.

11. The method of claim 8, wherein the receiving of the retransmission request receives the retransmission request from the at least one of the plurality of nodes via a diversity mode.

12. The method of claim 8, wherein the retransmitted multicast packet is channel coded at a lower coding rate than the previously transmitted multicast packet.

13. A multicast packet receiving method over a wireless communication network, the method comprising:
    receiving a multicast packet via a wireless channel;
    determining whether a transmission error occurs in the received multicast packet; and
    transmitting retransmission requests to a transmitting node of the multicast packet, according to a result of the determining, wherein the retransmission requests are simultaneously transmitted from a plurality of receiving nodes, which has received the multicast packet, to the transmitting node via the
wireless channel by synchronizing a transmission timing of the plurality of receivers, and have an identical destination address (DA) and an identical source address (SA),
wherein a retransmitting operation of the multicast packet is performed if a number of times of transmission of the multicast packet is not greater than a predetermined threshold, and
wherein a channel coding rate of the multicast packet is increased when previously transmitted sequential multicast packets are successfully transmitted for a predetermined number of times without a retransmission.

14. The method of claim 13,
wherein the multicast packet comprises forward error correction (FEC) information, and
wherein the transmitting of the retransmission request comprises:
correcting the transmission error by referring to the FEC information if it determined that the transmission error occurs in the received multicast packet, and
transmitting the retransmission request if the transmission error cannot be corrected.

15. A non-transitory computer-readable non-transitory storage medium having embodied thereon a computer program for performing a multicast packet transmitting and receiving method, the method comprising:
transmitting the multicast packet from a sender to a plurality of receivers via a wireless channel;
receiving the multicast packet at each of the plurality of receivers;
determining whether a transmission error occurs in the multicast packet; and
simultaneously transmitting retransmission requests from the plurality of receivers to the sender via the wireless channel by synchronizing a transmission timing of the plurality of receivers, according to a result of the determining,
wherein the retransmission requests have an identical destination address (DA) and an identical source address (SA),
wherein a retransmitting operation of the multicast packet is performed if a number of times of transmission of the multicast packet is not greater than a predetermined threshold, and
wherein a channel coding rate of the multicast packet is increased when previously transmitted sequential multicast packets are successfully transmitted for a predetermined number of times without a retransmission.

16. A multicast packet transmitting and receiving system over a wireless communication network, the system comprising:
a transmitting node which transmits the multicast packet via a wireless channel; and
a plurality of receiving nodes which receive the multicast packet from the transmitting node,
wherein each of the plurality of receiving nodes simultaneously transmits retransmission requests for the multicast packet to the transmitting node via the wireless channel, if a transmission error is detected in the received multicast packet,
wherein the retransmission requests have an identical destination address (DA) and an identical source address (SA),
wherein a retransmitting operation of the multicast packet is performed if a number of times of transmission of the multicast packet is not greater than a predetermined threshold, and
wherein a channel coding rate of the multicast packet is increased when previously transmitted sequential multicast packets are successfully transmitted for a predetermined number of times without a retransmission.

17. The system of claim 16, wherein each of the plurality of receiving nodes respectively transmits the retransmission request when the transmission error is detected in the received multicast packet, and the transmitting node retransmits the multicast packet to the plurality of receiving nodes if the retransmission request is received from at least one of the plurality of receiving nodes.

18. The system of claim 17, wherein the retransmitted multicast packet is channel coded at a lower coding rate than the previously transmitted multicast packet.

19. The system of claim 16, wherein the multicast packet comprises forward error correction (FEC) information, and
the receiving node corrects the transmission error by referring to the FEC information if the transmission error is detected in the multicast packet, and transmits the retransmission error if the transmission error cannot be corrected.

20. The system of claim 16, wherein the retransmission request is transmitted in a negative acknowledgement (NACK) packet type, and a destination address of the NACK packet is a network address of the transmitting node and a source address of the NACK packet is a multicast group address of the multicast packet.

21. The system of claim 16, wherein the retransmission request transmitted from the plurality of receiving nodes comprise packets of an identical type, and the transmitting node receives the retransmission request as a multipath signal.

22. The system of claim 16, wherein the transmitting node and the plurality of the receiving nodes transmit and receive the multicast packet and the retransmission request in an Orthogonal Frequency Division Multiplexing scheme.

23. The system of claim 16, wherein the transmitting node and the plurality of receiving nodes are connected together in an ultra-wideband system.

24. The system of claim 16, wherein the transmitting node is established at a base station or a wireless local area network access point.

25. A multicast packet transmitting node transmitting a multicast packet over a wireless communication network, the node comprising:
a transmitting unit which transmits the multicast packet to a plurality of nodes over the wireless communication network via a wireless channel; and
a receiving unit which receives retransmission requests as a multipath signal, from the plurality of nodes via the wireless channel, the retransmission request corresponding to the multicast packet,
wherein the transmitting unit retransmits the multicast packet to the plurality of nodes in response to the received retransmission request,
wherein the retransmission requests have an identical destination address (DA) and an identical source address (SA),
wherein a retransmitting operation of the multicast packet is performed if a number of times of transmission of the multicast packet is not greater than a predetermined threshold, and wherein a channel coding rate of the multicast packet is increased when previously transmitted sequential multicast packets are successfully transmitted for a predetermined number of times without a retransmission.

26. The multicast packet transmitting node of claim 25, wherein the transmitting unit waits for a predetermined time until the receiving unit receives the retransmission request from the at least one node of the plurality of nodes.

27. The transmitting node of claim 25, wherein the transmitting unit transmits a subsequent multicast packet when the retransmission request is not received until a predetermined time passes.

28. The transmitting node of claim 25, wherein the receiving unit receives the retransmission request from the at least one node of the plurality of nodes via a diversity mode.

29. The transmitting node of claim 25, wherein the transmitting unit codes the retransmitted multicast packet at a lower channel coding rate than a previously transmitted multicast packet.

30. A multicast packet receiving node which receives a multicast packet over a wireless communication network, the node comprising:
- a receiving unit which receives the multicast packet via a wireless channel, and checks whether a transmission error of the received multicast packet occurs in the multicast packet; and
- a transmitting unit which transmits retransmission requests to a transmitting node of the multicast packet according to a result of the checking,
- wherein the transmitting unit simultaneously transmits the retransmission request from a plurality of nodes to the transmitting node via the wireless channel by synchronizing a transmission timing of the plurality of receivers, the plurality of nodes having received the multicast packet and the retransmission requests have an identical destination address (DA) and an identical source address (SA),
- wherein a retransmitting operation of the multicast packet is performed if a number of times of transmission of the multicast packet is not greater than a predetermined threshold, and
- wherein a channel coding rate of the multicast packet is increased when previously transmitted sequential multicast packets are successfully transmitted for a predetermined number of times without a retransmission.

31. The multicast packet receiving node of claim 30, wherein the multicast packet comprises forward error correction information, the receiving unit, as a result of the checking, corrects the transmission error when the transmission error occurs in the multicast packet, and the transmitting unit transmits the retransmission request when the receiving node fails to correct the transmission error.

* * * * *